Sept. 11, 1956 G. KEGELES 2,762,254
ELECTROPHORESIS APPARATUS HAVING A PRISMATIC CELL
Filed Feb. 7, 1951 4 Sheets-Sheet 1
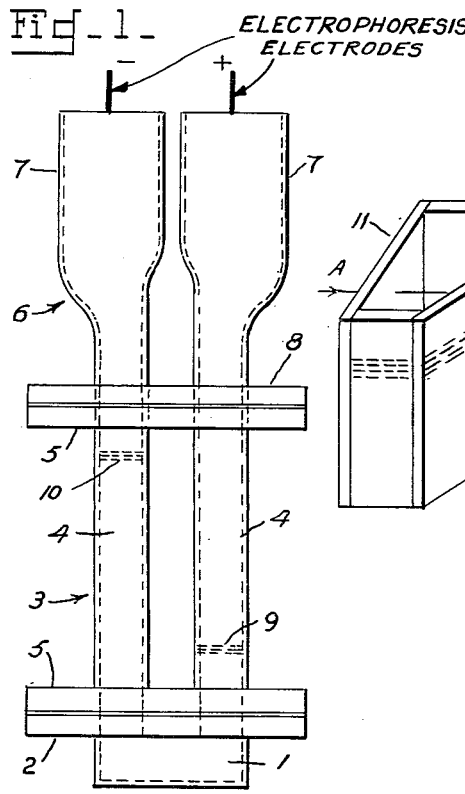
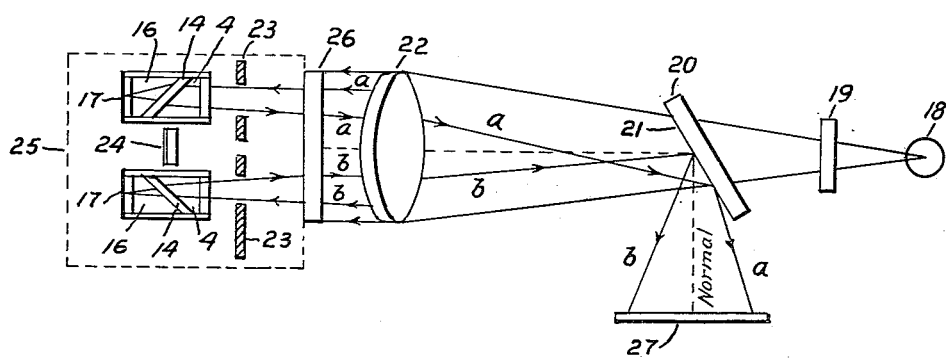
INVENTOR
Gerson Kegeles,
BY Gustave Miller
ATTORNEY Sept. 11, 1956  G. KEGELES  2,762,254
ELECTROPHORESIS APPARATUS HAVING A PRISMATIC CELL
Filed Feb. 7, 1951  4 Sheets-Sheet 2
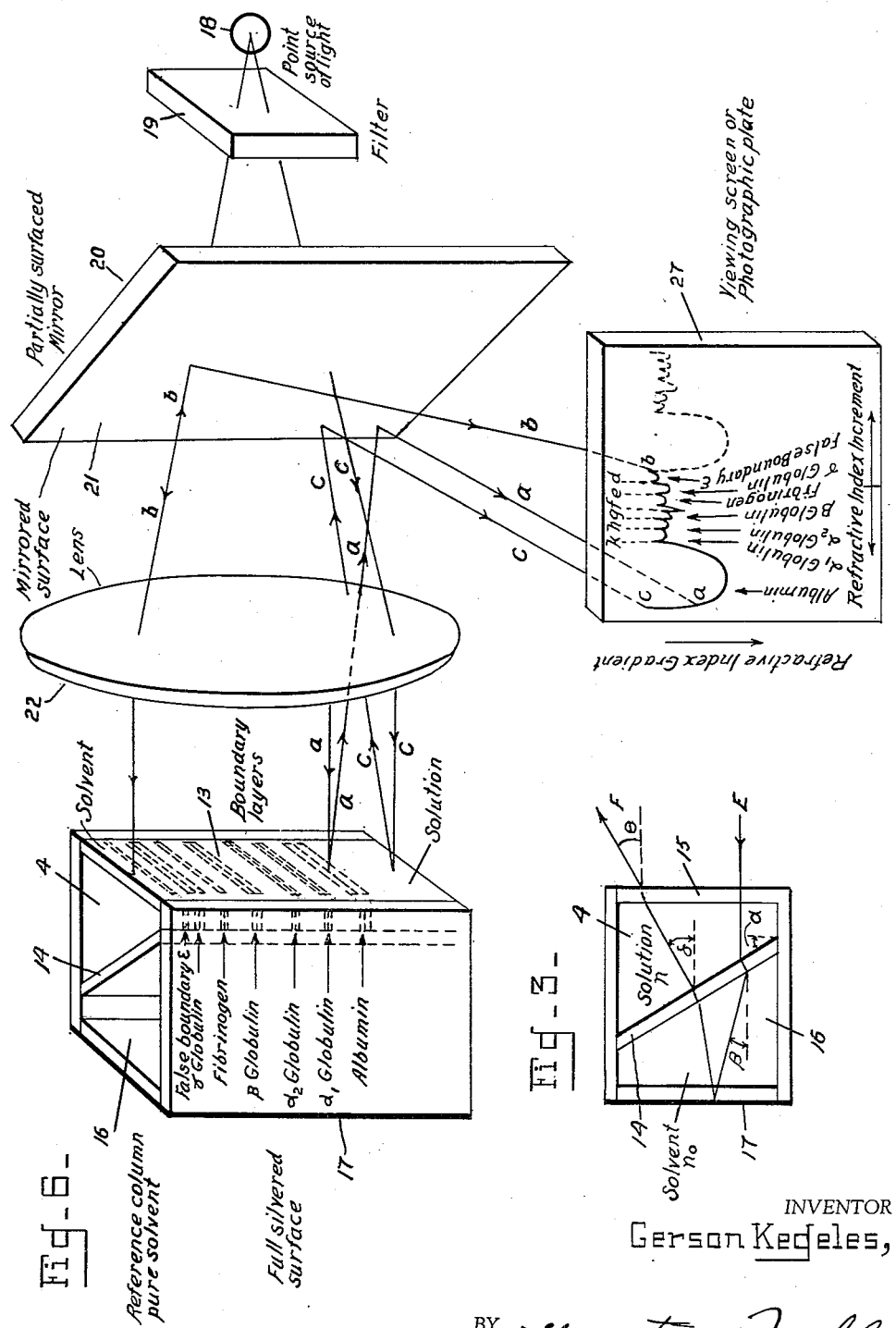
INVENTOR
Gerson Kegeles,
BY Gustave Miller
ATTORNEY

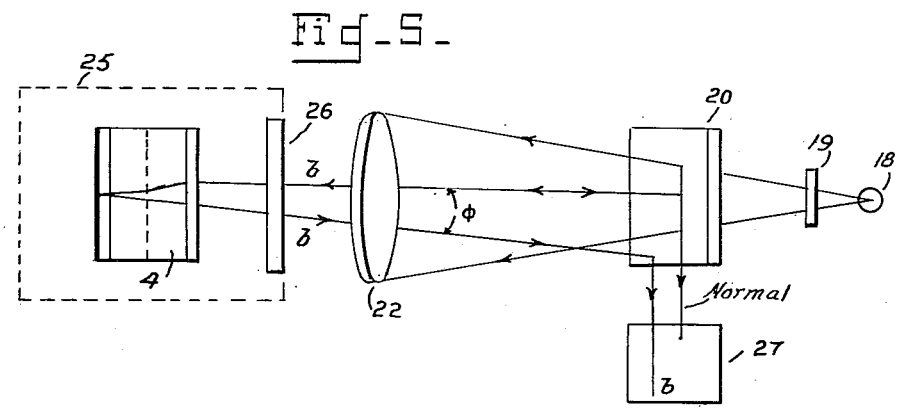
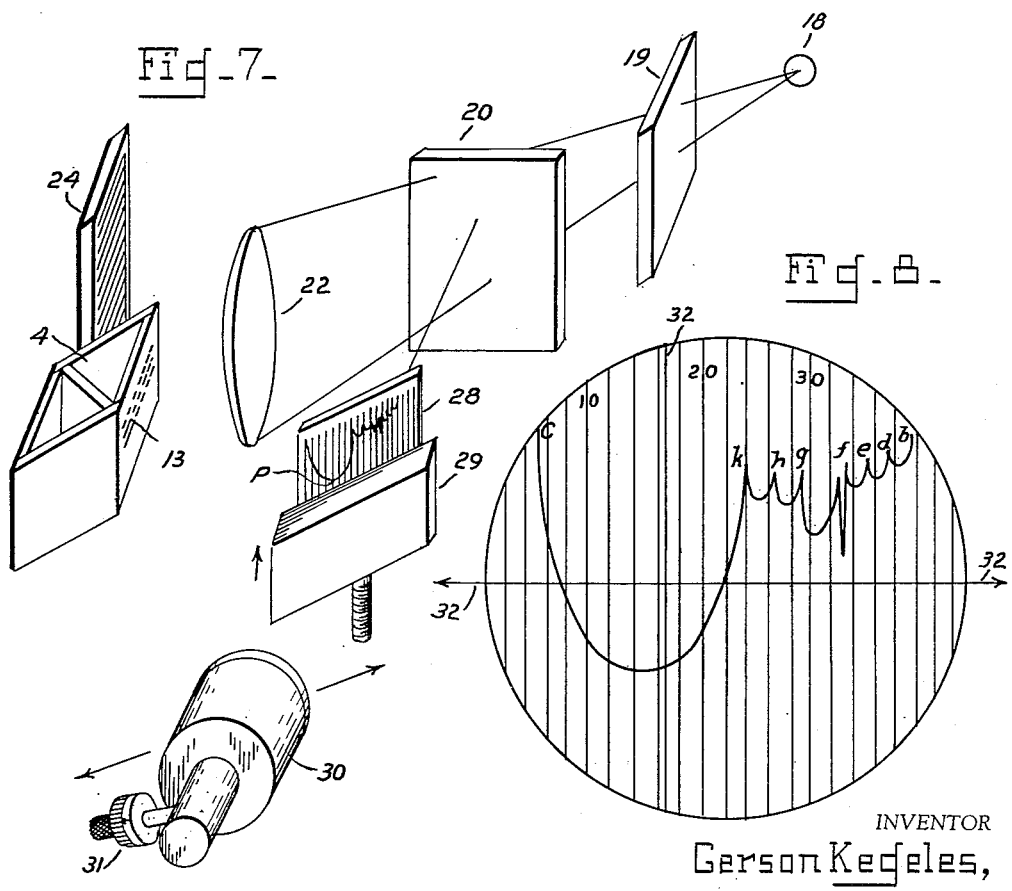

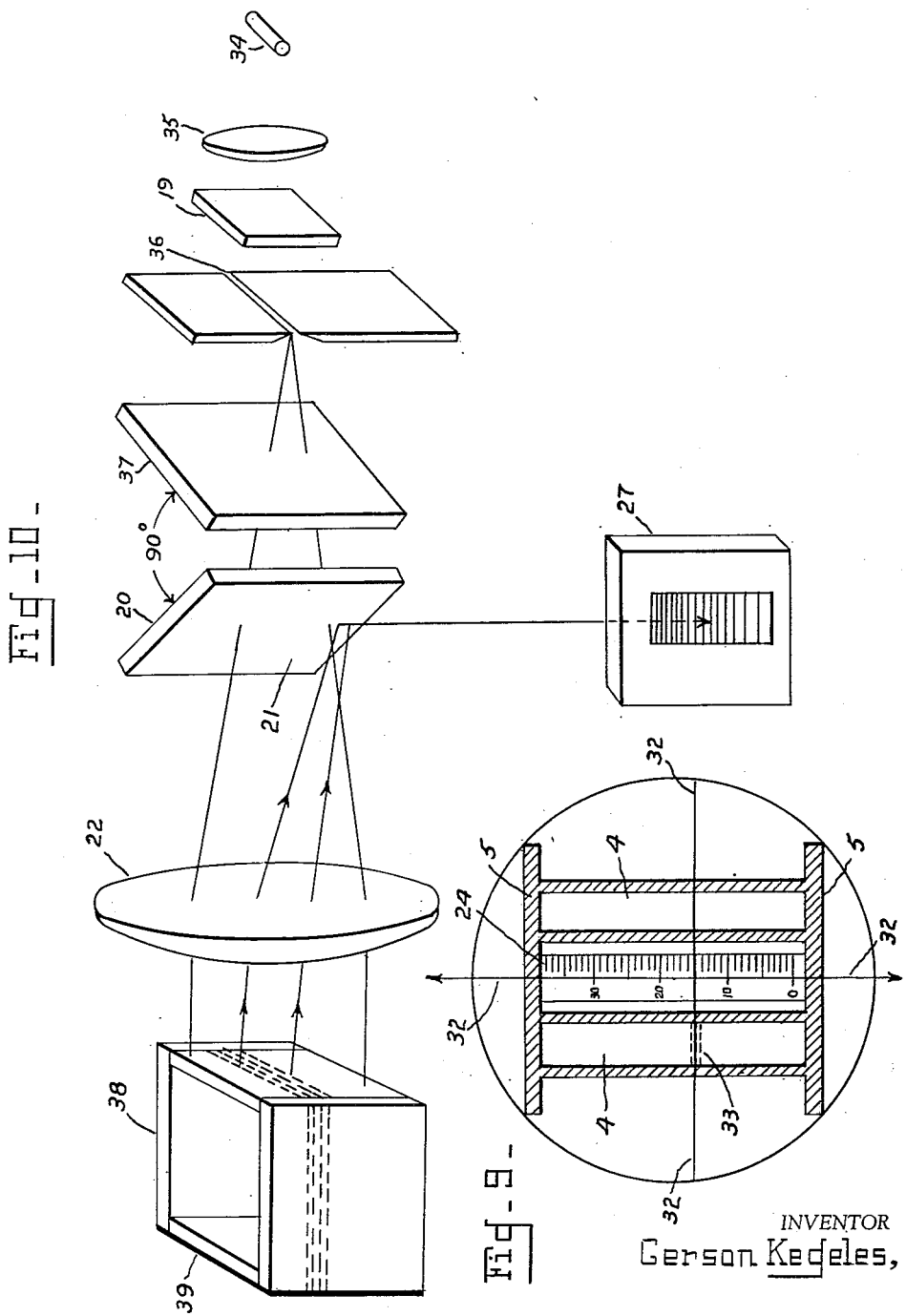

United States Patent Office 2,762,254
Patented Sept. 11, 1956

2,762,254

ELECTROPHORESIS APPARATUS HAVING A PRISMATIC CELL

Gerson Kegeles, Kensington, Md.

Application February 7, 1951, Serial No. 209,828

5 Claims. (Cl. 88—14)

This invention relates to "electrophoresis apparatus having a prismatic cell," and more particularly to non-interferometric optical refractometers and optical meters of refractive index gradients, and particularly their adaptation to the analysis of the kinds and concentrations, relative or absolute, of particles in suspension or solution in a liquid medium. The principles involved in this invention do not depend on and are in no way related to interferometers or to the interference of light. The analysis is accomplished through a unique dual combination of prismatic refractometric and conventional refractive index gradient-metric measurement of local changes in the refractive index, and also, in addition and independently and simultaneously, in the refractive index gradient of the suspension or solution produced by the imposition of electrical fields, by absorption, distillation, diffusion, or other means. Any suspension or solution which can be caused by such means to exhibit such local changes in refractive index and refractive index gradient may be analyzed according to the method of my invention. These local changes in refractive index and refractive index gradient are correlated with the concentration and concentration gradient changes responsible.

In one of the methods of the practice of my invention, concentration gradients are obtained by permitting the migration of charged particles of solute through a fixed voltage gradient. The several kinds of particles move in direction and with velocity determined by the nature of their electrical charge. This usually results in a stratification of the various kinds of solute particles. The formation, relative position in the vertical dimension of the container of the suspension or solution, number, degree of stratification, and magnitude of the local refractive indices and refractive index gradients are detected by the uniquely combined prismatic refractometric and refractive index gradient-metric method (to be described). The velocity of migration is estimated by telescopic observation of schlieren bands in the container, and by direct comparison of their positions with a scale adjacent to the container.

One of the objects of my invention is to provide a considerable reduction in size and complexity of the necessary apparatus over many other types of apparatus and methods usually employed, without the loss of accuracy. For example, it is possible to obtain precision diagrams by the method of my invention using a single lens, whereas a minimum of three lenses is required in the types of apparatus usually employed.

Another most important object of my invention is to reduce manyfold the time required for the measurement from the diagrams produced, of the composition of the suspension of solution in terms of the amounts of material in the contiguous stratified layers, separated, for example, by the imposition of an electric field. Due to the unique nature of the diagram produced by this unique combination of two separate optical principles, these amounts are indicated directly as distances between successive elevations in a continuous curve, which may be observed visually on a viewing screen, observed visually with a telescope against the background of a ruled screen or grating, compared with a fine scale, measured with a filar micrometer eyepiece, or measured with calipers with a comparator, with a ruler, or measured in any other standard way for the measurement of length.

It is also an object of my invention that the single diagram uniquely produced by my invention shall have completed in visible form within it a greater resolving power for the definition and distinction of contiguous stratified layers than the diagrams produced by methods usually employed for the recording of refractive index alone, such as interferometers. In the case of such instruments in customary use, it is generally necessary to photograph the interference fringes obtained, to measure their positions with auxiliary equipment from the processed photograph, to plot equal increments of concentration against fringe positions, and then to further take plotted or tabular differences between successive fringe positions to obtain the positions in the original diagram corresponding to maximum resolution of stratified layers.

It is a further object of my invention that the single diagram uniquely produced by my invention shall have completed in visible form within it the same resolving power for the definition and distinction of contiguous stratified layers as the diagram produced by methods customarily employed for the recording of refractive index gradient alone, such as schlieren optical methods employing a cylindrical lens and diaphragm.

It is a further object of my invention that the single diagram uniquely produced by my invention shall permit the direct and rapid precise quantitative evaluation of the amounts of material in contiguous stratified layers, without reference to standardized diagrams of any kind. This is of particular advantage, since standardized diagrams can in any case only be available in a relatively few reproducible systems of biological interest, and their use even in such cases cannot provide precise quantitative data.

It is a still further object of my invention that the single diagram uniquely produced by my invention shall permit the direct and rapid precise quantitative evaluation of the amounts of material in contiguous stratified layers without the necessity for making tracings, or making photographs and processing these before performing these quantiative evaluations. To perform such quantitative evaluations with the methods in customary use which record refractive index gradient alone, it is first necessary to transfer the diagrams obtained to paper, either by hand tracing from a viewing screen or by exposing and processing photographs, and then projecting and hand tracing the projected diagrams.

It is a still further object of my invention that the single diagram uniquely produced by my invention shall permit the direct and rapid precise quantitative evaluation of the amounts of material in contiguous stratified layers without the necessity for using an area-measuring instrument. To perform such quantitative evaluation with the methods in customary use which record refractive index gradient alone, it is necessary to determine, from the hand tracing of the diagram on paper, the cross-sectional areas of the regions on the tracings representing individual stratified layers in the container of the materials being studied.

Another object of my invention is to provide an apparatus for the analysis of synthetic polymer solutions, and for the analysis of solutions or suspensions of materials and mixtures of materials of biological origin, such as plasma, cerebrospinal fluid, toxins and toxids, antigens, vaccines, soluble extracts of tissue and extracts of cells and of subcellular particulates, nucleo-proteins, lipoproteins, nucleic acids, histones, proteins, peptides, and amino acids, this apparatus being useful also as an adjunct in the diagnosis of certain diseases, and combining simplicity of design with compactness and with rapidity in the production of analyses, without the necessity for additional photographic laboratory facilities to make use of the apparatus, as a precise quantitative instrument.

With the foregoing and other objects in view, as will hereinafter become apparent, this invention comprises the combinations, constructions, and arrangement of parts hereinafter set forth, disclosed, claimed and illustrated in the accompanying drawings, wherein:

Fig. 1 is a front elevation of an electrophoresis cell;

Fig. 2 is a perspective view of horizontal and vertical deflections of light passing through boundary layers in a cell of prismatic cross-section;

Fig. 3 is a plan view of a cell of double prismatic cross-section, indicating angular relationships on passage of light into the cell and return of the light by reflection from the rear face of the cell;

Fig. 4 is a plan view of electrophoresis apparatus;

Fig. 5 is an elevation view of the same electrophoresis apparatus as in Fig. 4;

Fig. 6 is a perspective diagrammatic view of the electrophoresis apparatus of Figs. 4 and 5, showing the registration at the viewing screen of a diagram depicting the electrophoretic resolution of human plasma;

Fig. 7 is a perspective diagrammatic view of the electrophoresis apparatus of Figs. 4, 5 and 6, but showing auxiliary method of observation and measurement of the diagrams on the viewing screen by means of a telescope and scale.

Fig. 8 shows the view seen in the telescope of Fig. 7, showing the enlarged diagram depicting electrophoretic resolution of human plasma;

Fig. 9 shows the view in the telescope of Fig. 7, showing cell and adjacent scale, with filar micrometer hairline of telescope superposed on image of schlieren band produced by raising knife-edge of Fig. 7 through diagram at viewing screen;

Fig. 10 shows a schematic rearrangement of the elements of the electrophoresis apparatus of Figs. 4, 5, 6, and 7, so as to be used for the study of diffusion by the method of Gouy.

*Operation of the equipment*

The utilization of the optical arrangement of my invention to produce convenient diagrams on a viewing screen or photographic emulsion, or in a plane under observation by an optical instrument, such as a telescope or a microscope, is outlined in terms of a representative experiment in electrophoresis of human plasma, although the same optical method is applicable to stratified layers resulting from other types of separation of other dissolved or dispersed solute materials, and it is not my intention to limit my invention in any way to this embodiment, which I use below solely to illustrate my invention.

The description of operations given in this paragraph represents standard procedure based on published work by A. Tiselius, Trans. Far. Soc. 33, 524 (1937) and L. G. Longsworth, Chem. Rev. 30, 323 (1942), and is intended only to form a logical basis for the further description of the apparatus and methodology which comprise my invention. In elevation, Fig. 1, the front view of the electrophoresis cell used in my invention looks like that of the standard tall-center-section cell of Tiselius-Longsworth. Part 1, made of glass plates, forms the bottom section of a U-tube, and is supported by a suitable rack underneath the plate 2. The center section 3, made up of two hollow channels 4, of the U-tube fastened to slotted end plates 5, rests on the bottom section 1 at the interface between plate 2 and the lower end plate 5. This interface is sealed with grease and constitutes a plane in which the center and bottom sections can be slid from side to side (Fig. 1) over each other.

The top section 6, Fig. 1, contains two tubes 7, each of which communicates with one of the channels 4 of the center section 3, through the slotted glass plate 8, whose interface with the upper end plate 5 of the center section is also greased and also constitutes a plane for sliding the top section 6 and the center section 3 over each other from side to side. The tubes 7 of the top section 6 serve to communicate the liquid under investigation in the U-tube, sections 1, 3, and 6, with the appropriate glass vessels containing electrodes for introduction of the electric current. To prepare boundary layers, for resolution by the electric current, between the plasma solution being investigated and a suitable conducting solvent medium, such as sodium diethylbarbiturate at 0.1 ionic strength to act as a buffer for maintaining constant hydrogen ion concentration at pH 8.6, the three cell sections 1, 3 and 6 are first brought into communication with each other through their slotted plates 2, 5 and 8, as shown in Fig. 1. Plasma solution, which has been prepared by dilution with and further dialysis against the buffer, is then introduced to fill the bottom section 1 and the center section 3 above the lower glass plate 5. The bottom section is then displaced laterally so as to close off communication between the bottom and center sections. The excess of solution above the glass plate interface in one of the limbs 4, say the right limb, is then removed, and after thorough washing replaced with solvent, which is communicated through the top section 6 and the right tube 7 with the liquid and electrode in the right electrode vessel. The plasma solution under investigation is then filled into the left channel 4, and into the left tube 7 of the top section 6, above the glass plate 8. Without being returned into communication with the bottom section, the center section 3, after reaching temperature equilibrium with a surrounding thermostat, is displaced laterally so as to close off communication between the center section and the top section 6. The excess solution in the left tube 7 above the glass plate interface between the center section 3 and the top section 6 is then removed, and after thorough washing, replaced with solvent, which is communicated with the liquid and electrode in the left electrode vessel. Customarily (see L. G. Longsworth, Chem. Rev. 30, 323 (1942), one of the electrode vessels is closed and the other open to the air. In returning the top, center and bottom sections 1, 3 and 6, into communication, as in Fig. 1, there is therefore no liquid flow around the U tube. However, at the interface between plates 5 and 8 of the center and top sections, there is formed at the left side of the U tube a sharp liquid interface having solvent above it and plasma solution below it, upon this return to communication. At the same time, a similar liquid interface is formed at the right limb of the U tube in the plane of the interface between plates 2 and 5 of the bottom and center sections. By appropriate introduction or removal of solvent at the closed electrode vessel these liquid interfaces are displaced into the optical channels 4, where they may be seen or photographed in positions such as 9 and 10. By connecting the electrodes in communication with tubes 7 to an electrical potential of appropriate magnitude to produce a voltage gradient of five to seven volts per centimeter inside the channels 4, and polarity as shown in Fig. 1, the two interfaces 9 and 10 between plasma solution and solvent are each drawn further into the respective channels 4 containing them, thereby becoming separated into a series of contiguous stratified layers, which move at rates which are characteristic in a given field, of the materials, albumin, $\alpha_1$ and $\alpha_2$ globulins, $\beta$-globulin, fibrinogen and $\gamma$-globulin, comprising these individual layers. In each of the channels 4, after electrolysis for some time, the material in the uppermost of these contiguous layers is pure solvent, while the material in the lowest of these contiguous layers is the original solution being investigated. Each intermediate interface between contiguous layers represents the disappearance or appearance of a class of substances, such as albumin, $\alpha_1$ and $\alpha_2$ globulins, etc., characterized by a definite velocity of migration in the electric field.

In conventional electrophoresis equipment, the cross section of the channels 4, Fig. 1, is rectangular. One of the principles involved in my invention, as applied to the examination of boundary layers containing variations of refractive index and refractive index gradient such as those produced in electrophoresis, consists in making the cross section of these channels prismatic rather than rectangular. Fig. 2 illustrates the effect of this type of cross section on the deflection of collimated light which traverses a layer of liquid in the channel whose refractive index may differ from the medium surrounding the channel, and in which there are refractive index gradients. In Fig. 2, the ray A, in a collimated beam coming from the left enters normal to the first glass wall 11 of the cell and then passes through the liquid in the channel. If this liquid contained no refractive index gradients, and possessed the same refractive index as the medium surrounding the channel, and assuming negligible thickness of the glass channel walls, the ray would leave the exit wall 12, at substantially the same inclinations to wall 11 as the entering ray and would reach the screen as ray B. If the cross-section of the channel were rectangular, and the light passed through vertical refractive index gradients in the liquid denoted by shading 13, the ray would leave the exit wall 12 of the channel deflected downward at an inclination with the horizontal $\phi$, proportional to the gradient, and would reach the screen as ray C. If the cross-section of the channel is prismatic, as illustrated in Fig. 2, and the liquid in the channel has a different refractive index from the medium surrounding the cell, then the ray A which enters the channel at a level containing refractive index gradients or boundary layers 13, will leave the exit face 12, deflected downward through the angle $\phi$, but, in addition, deflected sideward through an angle $\theta$, depending on the refractive index of the liquid. The optical method upon which my invention is based takes advantage of both the downward deflection $\phi$ and also the sideward deflection $\theta$ to produce a diagram which adequately distinguishes contiguous stratified layers from each other and directly estimates the amount of materials in each layer.

In one of several possible arrangements, which is described in detail here because of its experimental convenience, but to which it is in no way desired to restrict the scope of this invention, the cross-section of the prismatic channel 4, Fig. 1, of the center section 3, is arranged as shown in Fig. 3. Here the usual rectangular channel is divided by the glass plate 14, slanted at an angle $\alpha$ with the entrance window 15 into a prismatic channel 4, for the introduction of stratified layers of solution, and into a prismatic reference channel 16, which is filled with homogeneous liquid, which may conveniently be, but need not necessarily be restricted to be, the solvent medium. Entering the channel from right to left at right angles to the entrance wall 15 is a ray of light 9. On passing through the solution, having a refractive index $n$ at the particular level depicted in Fig. 3, this ray undergoes no deflection in the plane of the drawing. After passage through the separating plate 14, the ray is deflected through an angle $\beta$ on entering the second medium in the reference channel 16, if the liquid in this channel has a refractive index $n_0$, which differs from $n$. The rear wall 17 of the channel may conveniently be surfaced to form a mirror, in which case the ray returns after reflection from this wall through the separating plate 14. On re-entry into the solution, the ray is deflected further, its new deflection with its original path being denoted by $\delta$. On emergence from the original entrance wall 15, the light emerges as ray F, which is represented as being inclined at angle $\theta$ with the original ray E, in the plane of the drawing. The exact relationship, based on geometrical optics, between the exit angle $\theta$, calculated in vacuum, and the various angles and refractive indices in Fig. 3 is $$\sin \theta = \{n(1+\cos \delta) - 2n_0 \cos \beta\} \tan \alpha$$

The approximate equivalent of this relation, which would indicate a linear dependence of the angle $\theta$, on the refractive index increment, $$\frac{n-n_0}{\theta=2},$$

is $(n-n_0) \tan \alpha$.

The error of this approximation is given approximately by $$\sin \theta - \theta = -\frac{(n-n_0)^2}{n} \tan^3 \alpha$$

or, for a prism angle tangent equal to two, and a refractive index increment equal to 0.00370, corresponding approximately to a two percent protein solution in an aqueous solvent, the percentage error would amount to 0.56%. This systematic error can be corrected for quite readily, but even without correction the error is probably well below that made in the required measurements of area for the evaluation of the customary refractive index gradient diagrams, and it may also be below the error made in length measurements, corresponding in the method of my invention to concentrations of materials in stratified layers, in cases when these layers are not well resolved from each other in their physical positions in the liquid column. In the case that the light is not reflected from the back face of the cell, but transmitted only once through the prism cell, the prism angle tangent would need to be doubled to produce the identical deflection in the diagram, and a percentage error four times as large would result.

Fig. 4 shows a more complete schematic diagram of the optical arrangement, from a top view. It is noted that the two cell channels 4 (with end plates 5 not shown), have their slant plates 14, tilted in mirror image relationship to each other. This is done to eliminate the overlapping on the viewing screen or photographic plate of diagrams from the two limbs. Following the optical elements from right to left, Fig. 4, we have a point source of light 18, which may be a point arc or a hole in an opaque screen illuminated by a lamp and condenser lens. Light from the point source passes through a suitable filter 19 and a semi-reflecting mirror 20, partially surfaced on one side 21, to reach an astronomical telescope objective lens 22. That portion of the light which is reflected from the mirror on this part of the path is discarded and need not be considered further. The point source 18 is placed at the principal focus of the lens 22, which results in collimation of the light to the left of the lens, Fig. 4, into a parallel beam. This light then passes through three openings in an otherwise opaque screen 23, which allows any light passed to enter only the channels 4 or a fine scale 24, having horizontal graduations. The whole cell with channels 4 may conveniently be placed in a water bath thermostat 25 with a flat window 26. On entering solution in the first chambers 4, and then solvent in the second chamber 16, in both limbs, the light will become deflected, reflected and further deflected, in the plane of the drawing, as described in discussing Fig. 3. The ray $a$, Fig. 4, which enters and leaves the upper channel 4 of the drawing returns deflected to one side of the normal undeflected ray. The ray $b$ which enters and leaves the lower channel 4 of the drawing returns deflected to the other side of the normal undeflected ray. Thus on reflection from the partially surfaced mirror 20 to the viewing screen 27, the two rays $a$ and $b$ are displaced to either side of the returning normal rays. The optical lever for these displacements is the focal length of the lens 22.

Fig. 5 shows in elevation the recording of simultaneous downward deflections by the passage of light through boundary layers in the solution chambers of the cell limbs. This represents the customary usage of an optical lever to magnify such downward deflections, the optical lever again being the focal length of the lens. The downward deflection after entrance into and return from the cell is approximately given by $$\phi = 2a \frac{dn}{dx}$$

where $a$ is the average thickness of the channel 4 in the direction of the optic axis and $dn/dx$ is the average refractive index gradient through which the ray has passed. Since one wall of the chamber 4, containing the refractive index gradients is slant, that chamber has a variable thickness $a$, and the vertical deflections return to the viewing screen as a thick band of light for a single value of the refractive index gradient. To eliminate this effect the openings in the screen 23, Fig. 4, could be narrowed. However, for most purposes the thickness of the band would not be objectionable, and would cause no error in the estimation of concentrations of solute in the contiguous stratified layers.

To make clearer the picture of the simultaneous deflections of light in two directions, a three dimensional schematic diagram is shown in Fig. 6, indicating the origin and nature of the optical pattern produced, for example, in the electrophoresis of human plasma. At the extreme left in Fig. 6 is shown a section of the left channel 4, Fig. 1. This section is assumed to contain in its prismatic chambers 4 a column of solvent layered over a column of solution, with the boundary layers 13 indicated by dense shading, and, as a result of electrophoretic separation of the plasma, composed of several contiguous stratified layers, as indicated. From the point source of light 18 at the extreme right, rays diverge, pass through the filter 19, the partially surfaced mirror 20, and reach the lens 22, by which they are collimated into a parallel beam entering the channel 4. The ray $b$ represents a ray which has passed through solvent in both chambers of the cell, and after return without deflection from the cell is reflected to point $b$ on the screen 27, by the surface 21, of the mirror 20. Another ray $a$ enters the cell within the boundary layers and returns deflected laterally and downward, finally reaching the point $a$ on the screen 27, after reflection from the partially surfaced mirror 20. The ray $c$ is one which enters homogeneous solution below the boundary layers and therefore returns from the cell with no downward deflection. However, since it has passed from solution to solvent and back to solution before returning, it suffers a lateral deflection proportional to the refractive index difference between solution and solvent, as discussed in describing Fig. 3 above. Ray $c$, Fig. 6, therefore reaches the screen at a point $c$, in the same horizontal plane as point $b$. The distance $bc$ consequently represents the total refractive index increment from solvent to solution $n_s - n_0$, according to the relation (see discussion of Fig. 3):

$$bc = 2F(\tan \alpha)(n_s - n_0)$$

where $F$ represents the focal length of the lens and $\alpha$ represents the prism angle. At other points between rays $b$ and $c$ at the channel 4, rays entering the boundary layers will be deflected downward proportional to the refractive index gradient in the stratified layer traversed and will be deflected laterally proportional to the refractive index increment of the solution in the same stratified layer traversed. The accumulation of light at the screen from all these rays traces out a continuous curve of the function $F \cdot 2a(dn/dx)$ plotted vertically against the function $F \cdot 2(\tan \alpha)(n - n_0)$ plotted horizontally. The albumin, $\alpha$-globulin, $\alpha_2$-globulin, $\beta$-globulin, fibrinogen, and $\gamma$-globulin concentrations in the contiguous layers are proportional to the distances $ck$, $kh$, $hg$, $gf$, $fe$ and $ed$ (Fig. 6), respectively. The diagram from the other channel 4 of the cell, Fig. 4, would be as close a repetition of this diagram as the approximate physical identity of the concentration, and concentration gradient distributions in the two channels 4, would allow, and the contour of the curve from the right channel 4, Fig. 1, is shown dotted on the screen in Fig. 6. It should be noted that the relative positions of inverted peaks, travelling from the normal $b$, to the most displaced ray in the diagram, must correspond to the relative positions of stratified layers in the channel, traveling from top to bottom of the channel. Thus, for density-stable layers, the order is the same as usually found in electrophoresis diagrams.

While the arrangement with a single lens producing parallel light at the cell, and the reflection from the rear cell face and from a half surfaced mirror is believed to be a very compact arrangement, and at the same time the arrangement least subject to systematic errors, other arrangements making use of the identical principles are possible. It is not intended to limit my invention to the arrangement described in detail, but rather it is desired to include in my invention the use of a point source of light, a prismatic cell, and a lens system, regardless whether using one lens or two, whether producing parallel, converging, or diverging light at the cell, and whether the light passes through the cell once, or any number of times greater than once, by means of reflections. It is also a simple matter to decrease the overall dimensions of the apparatus by multiple reflections from full surfaced mirrors, and it is desired to include such arrangement within the scope of this invention. Since it is also possible to produce similar diagrams, which I have, in fact, experimentally demonstrated to my satisfaction, by use of a cell containing a single prism shaped chamber for solution, with the whole cell dipping into a rectangular chamber of water or other reference solvent, I desire to include this arrangement in my invention. It is also possible to use any other homogeneous liquid rather than solvent as a reference liquid, which arrangement I desire to include as part of my invention. It is also possible to combine lateral deflections caused by means of total internal reflection at an interface with downward deflections caused by passage of light through stratified layers containing refractive index gradients, and I desire to include any such experimental combination, utilizing both deflections, as part of my invention.

As mentioned in the introductory paragraphs, many experimental arrangements are possible for the precise measurement of lateral deflections at the plate, which are proportional to the amounts of materials constituting individual stratified layers in the solution column. One such arrangement which is particularly convenient, because it provides in the same apparatus a means for measuring the rates of vertical migration of these layers in the solution column, is described below, but it is in no way intended that the scope of my invention shall be limited to this particular arrangement, which is described in detail merely to indicate the feasibility of obtaining quantitative data by the use of my invention without the need for first exposing and processing photographic plates.

In principle, this arrangement, as shown diagrammatically in Fig. 7, consists of a telescope 30 which can be focused in the plane of the image of the point source 18 on a calibrated transparent scale 28, having numbered vertical lines.

This telescope may conveniently be mounted so as to move laterally (arrows, Fig. 7) across this image plane, although this will be unnecessary if the telescope objective lens has a sufficiently wide aperture. With the telescope focused on the scale 28 and on a superposed diagram, in this plane, of stratified layers 13 in the channel 4, an enlarged image is observed of the type of diagram illustrated, against a background of numbered scale lines. The horizontal distances corresponding to amounts of material in contiguous stratified layers 13 in the channel 4 can be read off directly from the scale lines in the image formed by the telescope. To increase the precision of reading, the telescope can be supplied with a filar eyepiece micrometer (indicated diagrammatically by the manual adjusting knob 31) which is employed as a vernier for estimating fractions of divisions of the scale 28. A representative diagram of the view in the telescope is shown in Fig. 8. The arrows show the direction of motion of the cross-hair 32 from the filar eyepiece micrometer 31, Fig. 7, of the telescope 30, which cross-hair is superposed on the image of the scale 28 and the optical diagram. Calibration of the drum 31, Fig. 7, with the scale 28 permits precise vernier reading of the horizontal distances between the points $b$, $d$, $e$, $f$, $g$, $h$, $k$ and $c$ shown.

In order to observe rates of migration of the stratified layers 13 in the channel 4, a similar arrangement of telescope and scale is applied to observation of the schlieren bands of Toepler-Tiselius (see A. Tiselius, Trans. Far. Soc, 33, 524 (1937); L. G. Longsworth, Ind. Eng. Chem. Anal. Ed. 18, 219 (1946). The telescope 30, Fig.7, is rotated through 90° about its axis, and refocused on the plane of the channel 4 and the adjacent scale 24, Fig. 4 and Fig. 7. The scale 24 has numbered horizontal lines ruled on its fine-ground front surface, and is calibrated. The rear surface of the scale 24 is surfaced to reflect incident light back to the telescope 30. A blade 29 with a bevelled horizontal edge in the plane of the image of the source 18 is arranged to be raised adjustably in this plane. When the blade is raised high enough to cut off light, such as at point $p$ in the diagram, Fig. 7, the image of the channel 4 in the telescope becomes dark at the level from which light has been deflected to point $p$. The position of this dark schlieren band 33, Fig. 9, can be read directly from the adjacent scale lines in the field of the telescope, as shown in Fig. 9. The use of the filar eyepiece micrometer 31, Fig. 7, again permits vernier reading of horizontal levels by means of the cross-hair 32, Fig. 9, movable vertically as indicated by the arrows.

Since the optical elements of Figs. 4, 5 and 6 provide a simple arrangement by which photography can be carried out in the plane containing the image of the source 18, this arrangement, on substituting a diffusion cell of rectangular cross-section for the prismatic cell, offers a simple means for the study of diffusion by the method of Gouy (see G. L. Gouy, Comptes Rend. Acad. Sci. 90, 307, (1880); L. G. Longsworth, Ann. N. Y. Acad. Sci. 46, 211 (1945); L. G. Longsworth, J. Amer. Chem. Soc. 69, 2510 (1947); G. Kegeles and L. J. Gosting, J. Amer. Chem. Soc. 69, 2516 (1947); C. A. Coulson, J. T. Cox, A. G. Ogston, and J. St. L. Philpot, Proc. Roy. Soc. A 192, 382 (1948); L. J. Gosting, E. M. Hanson, G. Kegeles, and M. S. Morris, Rev. Sci. Instr. 20, 209 (1949)).

In this method, without the introduction of any optical elements to produce interference of light, the diffusing boundary itself produces a diffraction and interference phenomenon in the light which traverses it. The arrangement, Fig. 6, is not directly suitable for the production of Gouy diffusion patterns, but the major fundamental change required is experimentally quite simple, consisting of matching the partially surfaced mirror 20 with a phase compensating plate. A suitable arrangement is shown in Fig. 10. Here a vapor lamp 34 throws light through a condenser lens 35 and a monochromat filter 19 on a parallel-jawed slit 36, which then acts as the primary source of light for the remainder of the optical system. Light from the slit 36 then passes through the phase compensator plate 37, the partially surfaced mirror 20, and the lens 22, by which it is collimated to form a parallel beam entering the diffusion cell 38. In the absence of the phase compensator plate 37, which has the same thickness and refractive index as the plate 20, forming the mirror, phase changes would be produced in the light passing through the plate 20, which would depend on the angle which individual entering rays make with the plate. This would effectively destroy the congruence of the wave front, and spoil the interference diagram. If each plate 20 and 37 is inclined at 45° with respect to the optic axis from slit center 36, to lens center 22, the plates being matched and mutually perpendicular, congruence of the wave front is again achieved, and light entering the cell 38 and returning by reflection from the mirrored surface 39 will be reflected from the surface 21 of the partially surfaced mirror and form a Gouy pattern on the screen or photographic emulsion as indicated.

In addition to being different from arrangements heretofore described for study of diffusion by the method of Gouy, the arrangement of Fig. 10 affords many practical advantages. It provides for the use of parallel light, together with a long optical lever in a relatively compact instrument. Furthermore, by arranging for traverse of the light through the cell twice, it provides a diagram which is twice as long, and which contains twice as many fringes, as that produced by a single passage of light through the same cell. The specific results of this effect are 1st. For substances which show a marked change of diffusion coefficient with concentration, the concentration increment across the boundary can be halved with the same resultant diagram, thus approaching more nearly the case of differential diffusion.

2nd. For a given concentration increment across the boundary, the depth, and hence the cross-section of the channel, can be halved with the same resultant diagram. This reduction in cross-section results in the formation of a much sharper initial boundary when boundary sharpening methods are used (see D. S. Kahn and A. G. Polson, J. Phys. Coll. Chem. 51, 816 (1947); C. A. Coulson, J. T. Cox, A. G. Ogston, and J. St. L. Philpot, Proc. Roy Soc. A 192, 382 (1948); L. J. Gosting, E. M. Hanson, G. Kegeles, and M. S. Morris, Rev. Sci. Instru. 20, 209 (1949)), and the consequent reduction in the zero time correction (L. G. Longsworth, J. Amer. Chem. Soc. 69, 2510 (1947)) contributes very materially to an increase in the absolute accuracy of the measurement of the diffusion coefficient.

3rd. Finally, if the concentration increment and the depth of the cell are held unchanged, the double length diagram containing twice the number of fringes as the diagram produced by a single passage of light through the cell yields more precise data, because the total number of fringes, and the downward displacement of fringes, both of which factors enter directly into the computation of diffusion coefficients, can each be determined with greater relative precision.

Due to limitations of space, it has not been practical to show the cells in proper sizes or proportions. However, as one example of proper proportions, the cell walls may be 3 mm. in thickness, the width across the inside of the cell channel may be 3 mm., the depth from front to back of the inside of the cell channel may be 25 mm., the distance between the adjacent surfaces of plates 5 may be 86 mm., and such drawings should be interpreted with these or other suitable proportions in mind.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A system of analysis of materials in a liquid being subjected to electrophoresis, comprising a cell of prismatic cross-section in which the liquid is confined, a graduated scale with numbered horizontal lines adjacent to the cell, a point source of light, a scale graduated with vertical lines, means arranged to project an image from said point source of light through the materials in the liquid in the cell to focus on said vertically graduated scale to provide a resultant diagram capable of being noted against the background of said vertically graduated scale, a telescope having a filar eyepiece micrometer for horizontal or vertical movements, said telescope being located behind said vertically graduated scale, said vertically graduated scale being in the focal plane of said resultant diagram, a blade of adjustable height having a horizontal edge beveled in the plane of said resultant diagram, said telescope being capable of focusing on said resultant diagram and measuring said resultant diagram against the background of said vertically graduated scale, said telescope being also alternately capable of focusing on said cell together with said horizontally graduated scale, said blade being vertically movable to produce schlieren bands in the image in said telescope of said cell whose positions may be measured opposite the image of the lines on said horizontally graduated scale.

2. A system of analysis of materials in a liquid being subjected to electrophoresis, comprising a cell of prismatic cross-section in which the liquid is confined, the front wall of said cell being transparent, the rear wall being reflectively coated to provide a mirror, a graduated scale with numbered horizontal lines adjacent to the cell, a point source of light, a partially surfaced mirror in the path of the light, a scale graduated with vertical lines, means arranged to project an image from said point source of light through the materials in the liquid in the cell and reflecting back therethrough to focus on said vertically graduated scale to provide a resultant diagram capable of being noted against the background of said vertically graduated scale, a telescope having filar eyepiece micrometer for horizontal or vertical movements, said telescope being located behind said vertically graduated scale, said vertically graduated scale being in the focal plane of said resultant diagram, a blade of adjustable height having a horizontal edge beveled in the plane of said resultant diagram, said telescope being capable of focusing on said resultant diagram and measuring said resultant diagram against the background of said vertically graduated scale, said telescope being also alternately capable of focusing on said cell together with said horizontally graduated scale, said blade being vertically movable to produce schlieren bands in the image in said telescope of said cell whose positions may be measured opposite the image of the lines on said horizontally graduated scale.

3. A system of analysis of materials in a liquid being subjected to electrophoresis, comprising a cell having an angular transparent wall providing a cell of double prismatic cross-section in one channel of which the liquid with the materials is confined, the other channel containing a reference liquid, the front wall of said cell being transparent, the rear wall being reflectively coated to provide a mirror, a graduated scale with numbered horizontal lines adjacent to the cell, a point source of light, a partially surfaced mirror in the path of the light, a scale graduated with vertical lines, a lens projecting an image from said point source of light through the liquids in the cell and back again to focus on said vertically graduated scale to provide a resultant diagram capable of being noted against the background of said vertically graduated scale, a telescope having filar eyepiece micrometer for horizontal or vertical movements, said telescope being located behind said vertically graduated scale, said vertically graduated scale being in the focal plane of said resultant diagram, a blade of adjustable height having a horizontal edge beveled in the plane of said resultant diagram, said telescope being capable of focusing on said resultant diagram and measuring said resultant diagram against the background of said vertically graduated scale, said telescope being also alternately capable of focusing on the channels of said cell together with said horizontally graduated scale, said blade being vertically movable to produce schlieren bands in the image in said telescope of said cell whose positions may be measured opposite the image of the lines on said horizontally graduated scale.

4. For use in electrophoretically analyzing material contained in a liquid, an electrophoresis cell of rectangular cross-section provided internally with an angularly disposed transparent window to define a cell of double prismatic cross-section, the liquid with the materials to be analyzed electrophoretically being contained in the cell on one side of said window, a reference liquid being contained in the cell on the other side of said window, the front wall of said rectangular cell being transparent and the rear wall of said rectangular cell being reflectively coated to form a mirror, image-receiving means, a point source of light, a light filter in the path of light from said source, a semi-transparent mirror in said path, a lens projecting an image of said point source of light into the cell through said transparent front wall, said image passing through the liquids and reflecting back from said rear wall mirror through the liquids and said transparent front wall, returning through said lens, and reflecting from said semi-transparent mirror to come to focus on said image-receiving means, said image-receiving means being provided with a graduated scale with vertical lines, whereby a resultant electrophoresis diagram is formed against the background of the scale lines.

5. For use in analyzing material contained in a liquid, an optical arrangement comprising a cell of rectangular cross-section provided internally with an angularly disposed transparent window to define a cell of double prismatic cross-section, the liquid with the materials to be analyzed being contained in the cell on one side of said window, a reference liquid being contained in the cell on the other side of said window, the front wall of said rectangular cell being transparent and the rear walls of said rectangular cell being reflectively coated to form a mirror, means whereby refractive index gradients will be established in the liquid in accordance with the materials in the liquid, a point source of light, a semi-transparent mirror in the path of the light, image-receiving means, lens means projecting an image of said point source of light into the cell through said transparent front wall, said image passing through the liquids and reflecting from said rear wall mirror back through the liquids and said transparent front wall, returning through said lens means, and reflecting from said semi-transparent mirror to come to focus on said image-receiving means, whereby a diagram will be formed on said image-receiving means resulting from the deviations of the image rays.

References Cited in the file of this patent

UNITED STATES PATENTS

| 830,225 | Haber | Sept. 4, 1906 |
| 1,007,346 | Fery | Oct. 31, 1911 |
| 1,776,712 | Voellmy | Sept. 23, 1930 |
| 1,939,088 | Styer | Dec. 12, 1933 |
| 2,362,235 | Barnes | Nov. 7, 1944 |
| 2,406,320 | Chubb | Aug. 27, 1946 |
| 2,412,602 | Chambers et al. | Dec. 17, 1946 |
| 2,421,854 | Seaman | June 10, 1947 |
| 2,423,383 | Hershberger | July 1, 1947 |
| 2,427,996 | Seaman | Sept. 23, 1947 |
| 2,445,044 | Stamm et al. | July 13, 1948 |
| 2,495,297 | Stern | Jan. 24, 1950 |
| 2,502,503 | Berkley | Apr. 4, 1950 |

FOREIGN PATENTS

| 11,200 | Great Britain | of 1905 |
| 503,167 | Great Britain | Apr. 3, 1939 |
| 919,843 | France | Dec. 16, 1946 |
| 261,670 | Switzerland | May 31, 1949 |
| 629,535 | Great Britain | Sept. 22, 1949 |

OTHER REFERENCES

Hardy and Perrin: Principles of Optics, first edition, published by McGraw-Hill Book Co., New York city, 1932, pp. 12, 13, 14, 29, 30.